United States Patent
Harper et al.

(10) Patent No.: US 12,194,810 B2
(45) Date of Patent: Jan. 14, 2025

(54) SYSTEMS AND METHODS FOR MANAGING MULTIPLE VEHICLE CABIN HEAT SOURCES AND MULTIPLE CONTROLLERS

(71) Applicant: Phoenix Motor, Inc., Anaheim, CA (US)

(72) Inventors: James Harper, Greenville, SC (US); Kevin Rodden, Burlingame, CA (US); Scott Hall, Burlingame, CA (US)

(73) Assignee: Phoenix Motor, Inc., Anaheim, CA (US)

( * ) Notice: Subject to any disclaimer, the term of this patent is extended or adjusted under 35 U.S.C. 154(b) by 113 days.

(21) Appl. No.: 17/820,971

(22) Filed: Aug. 19, 2022

(65) Prior Publication Data

US 2024/0059123 A1 Feb. 22, 2024

(51) Int. Cl.
*B60H 1/00* (2006.01)
*B60H 1/22* (2006.01)

(52) U.S. Cl.
CPC ..... *B60H 1/00735* (2013.01); *B60H 1/00392* (2013.01); *B60H 1/22* (2013.01); *B60H 2001/2237* (2013.01); *B60H 2001/224* (2013.01)

(58) Field of Classification Search
CPC .. B60H 1/00735; B60H 1/22; B60H 1/00392; B60H 1/143; B60H 2001/2237; B60H 2001/224
See application file for complete search history.

(56) References Cited

U.S. PATENT DOCUMENTS

| | | | |
|---|---|---|---|
| 2016/0214456 A1* | 7/2016 | Maranville | B60H 1/00392 |
| 2016/0355068 A1* | 12/2016 | Sutherland | H05K 999/99 |
| 2019/0299746 A1* | 10/2019 | Hu | B60H 1/143 |
| 2019/0381861 A1* | 12/2019 | Maniam | B60H 1/323 |
| 2020/0055371 A1* | 2/2020 | Herr-Rathke | B60H 1/00278 |
| 2020/0086715 A1* | 3/2020 | Pursifull | B60H 1/00885 |

* cited by examiner

*Primary Examiner* — Aaron L Troost
(74) *Attorney, Agent, or Firm* — Bookoff McAndrews, PLLC

(57) ABSTRACT

Systems and methods of controlling temperature in a cabin of an electric vehicle that has an HVAC system powered by a battery system and an auxiliary heating system. Upon determining, by a system controller, that a setpoint temperature is less than or equal to a sensed cabin temperature while operating in an HVAC electric heat state, an auxiliary heat state, or a maximum heat state, automatically transitioning to an off state from the HVAC electric heat state, the auxiliary heat state, or the maximum heat state.

18 Claims, 6 Drawing Sheets

SYSTEMS AND METHODS FOR MANAGING MULTIPLE VEHICLE CABIN HEAT SOURCES AND MULTIPLE CONTROLLERS

TECHNICAL FIELD

Embodiments of this disclosure relate to systems and methods for managing temperature and heat sources of an electric vehicle.

BACKGROUND

An electric vehicle, also referred to as an electric drive vehicle, uses an electric motor for propulsion. Electric vehicles may include all-electric vehicles where the electric motor is the sole source of power, and hybrid electric vehicles that include an auxiliary power source in addition to the electric motor. In an electric vehicle, energy may be stored in a battery system located in the electric vehicle. Typically, the battery system for an electric vehicle includes multiple batteries connected together. To power the electric motor and other electrical accessories of the electric vehicle, energy is discharged from the battery system. When the stored energy decreases, the battery system is charged (or recharged) by connecting the vehicle to an external or auxiliary power supply. The amount of current that can be directed into the battery system during charging, and drawn out of the battery system during discharging, may vary based on the specific operating conditions, such as temperature.

Additionally, electric vehicles often include a passenger cabin and one or more power electronic systems (motors, inverters, converters, air compressors, etc.). The passenger cabin and the power electronic systems may also be cooled or heated during operation of the electric vehicle. In larger electric vehicles specifically, like a transit bus, managing multiple sources of heat can be difficult, including determining which source of heating or cooling should be used based on varying operating scenarios.

Moreover, different users may require or prefer different settings under different conditions. For example and without limitation, such settings can include the performance prioritization over range (e.g., minimizing battery usage) or minimizing performance in-lieu of range extension. In some examples, users could choose to balance range and performance. In configurations with different styles of heat source, including those with emissions, a user may want to minimize emissions. Control inputs for such operation settings can include ambient temperature, cabin temperature, time in heating, bus State of Charge (SoC), door position, cabin temperature setpoint, and fuel level (for auxiliary diesel heaters) and the like. Heat and cooling sources of an electric vehicle also can have their own controller (e.g., controllers for the HVAC, a controller for the Defroster, etc.). Each controller needs to communicate and be controlled to determine which sources are used.

Finally, to increase the life and efficiency of the battery system, it is desirable to optimize power use of the battery system associated with these temperature management sources balanced against a desired vehicle operational range. The solution of this disclosure resolves these and/or other issues of the art.

SUMMARY

Embodiments of the present disclosure relate to, among others, systems and methods for managing issues of efficiency and performance in an electric vehicle with multiple heat sources. In one aspect, the present disclosure may be directed to an electric vehicle, including a body enclosing a cabin and a temperature management system including an HVAC system powered by a battery system of the electric vehicle and an auxiliary heating system powered by an auxiliary power generator (e.g., a diesel auxiliary heater). A temperature in the cabin is regulated by the temperature management system. A controller of the system can be configured to determine if a setpoint temperature is less than or equal to a sensed cabin temperature while operating the HVAC system in an HVAC electric heat state, the auxiliary heating system in an auxiliary heat state, or operating both the HVAC system and the auxiliary heating system in a maximum heat state; and if the setpoint temperature is less than or equal to the sensed cabin temperature, then automatically transitioning from the HVAC electric heat state, the auxiliary heat state, or the maximum heat state to an off state.

In some aspects, the system controller is configured to determine that one or more temperature anomalies are present or trending to be present in the cabin; and based on the determined one or more temperature anomalies, recommend or perform one or more corrective actions, the one or more corrective actions including generating and transmitting an operational signal to the auxiliary heating system so as to manage operations of one or more radiators, bus body pass-thrus, a water heater, one or more expansion tanks, one or more coolant pumps, and/or defroster.

In some aspects, the system controller determines one or more temperature anomalies using a trend model for early detection of temperature anomalies before temperature conditions occur thereby increasing vehicle efficiency, the trend model having been trained using a learned set of heating operation parameters of the temperature management system to predict one or more temperature parameters associated with the one more temperature anomalies.

In some aspects, the system controller is configured to determine an ambient temperature; and upon determining that the sensed cabin temperature is less than the setpoint temperature, determine whether an HVAC and/or auxiliary heat ambient temperature cutoff is greater than the ambient temperature.

In some aspects, the system controller is configured to, upon determining that the HVAC and/or auxiliary heat ambient temperature cutoff is greater than the ambient temperature, transition to the HVAC electric state for a duration of a heat timer.

In some aspects, the system controller is configured to, upon determining that a heat time minimum of the HVAC electric state is greater than the duration of the heat timer, transition to the auxiliary heat state to achieve the maximum heat state until the sensed cabin temperature is greater than or equal to the setpoint temperature.

In some aspects, the system controller is configured to, upon determining that the setpoint temperature is less than or equal to the sensed cabin temperature while operating in the maximum heat state, automatically transitioning from the maximum heat state to the off state.

In some aspects, the system controller is configured to, upon determining that the HVAC and/or auxiliary heat ambient temperature cutoff is less than the ambient temperature, determine whether a difference between the setpoint temperature and the sensed cabin temperature is greater than a minimum auxiliary heat temperature differential limit.

In some aspects, the system controller is configured to, upon determining that the difference between the setpoint temperature and the sensed cabin temperature is greater than a minimum auxiliary heat temperature differential limit, transition to the HVAC electric state for a duration of a heat timer.

In one aspect the present disclosure may be directed to a method of controlling temperature in a cabin of an electric vehicle with a temperature management system, the electric vehicle including an HVAC system powered by a battery system of the electric vehicle and an auxiliary heating system. The method can include upon determining, by a system controller of the temperature management system, that a setpoint temperature is less than or equal to a sensed cabin temperature while operating in an HVAC electric heat state, an auxiliary heat state, or a maximum heat state, automatically transitioning from the HVAC electric heat state, the auxiliary heat state, or the maximum heat state to an off state.

In some aspects, the method includes controlling, by the system controller, sub-controllers of the HVAC system and the auxiliary heating system.

In some aspects, the method includes delivering heat, by the HVAC system in the HVAC electric heat state, to the cabin of the electric vehicle; delivering heat, by the auxiliary heating system in the auxiliary heat state, to the cabin of the electric vehicle; delivering heat, by both the auxiliary heating system and the HVAC system in the maximum heat state, to the cabin of the electric vehicle; and/or deactivating the auxiliary heating system and the HVAC system in the off state.

In some aspects, the method includes upon determining, by the system controller, that a difference between the setpoint temperature and the sensed cabin temperature is greater than an auxiliary heat temperature differential limit, automatically transitioning from the off state to the auxiliary heat state.

In some aspects, the auxiliary heat temperature differential limit is a temperature away from the setpoint temperature to transition to the auxiliary heat state.

In some aspects, the method includes upon determining, by the system controller, that a difference between the setpoint temperature and the sensed cabin temperature is greater than an auxiliary heat temperature differential limit, automatically transitioning from the HVAC heat state to the auxiliary heat state.

In some aspects, the method includes upon determining, by the system controller, that a difference between the setpoint temperature and the sensed cabin temperature is less than an auxiliary heat temperature differential limit, automatically transitioning from the off state to the HVAC heat state.

In some aspects, the method includes upon determining, by the system controller, that a difference between the setpoint temperature and the sensed cabin temperature is less than an auxiliary heat temperature differential limit, automatically transitioning from the auxiliary heat state to the HVAC heat state.

In some aspects, the method includes upon determining, by the system controller, that a heat timer of the HVAC heat state and/or the auxiliary heat state has expired, automatically transitioning from the HVAC heat state and/or the auxiliary heat state to the maximum heat state.

In some aspects, the heat timer is defined as an amount of time both heat sources can turn on if the setpoint temperature is not reached.

In one aspect the present disclosure may be directed to a temperature management system for an electric vehicle. The temperature management system can include an HVAC system powered by a battery system of the electric vehicle and an auxiliary heating system. The HVAC system and the auxiliary heating system are configured to condition air within a cabin of the electric vehicle. A control unit configured to determine if a setpoint temperature is less than or equal to a sensed cabin temperature while operating the HVAC system in an HVAC electric heat state, the auxiliary heating system in an auxiliary heat state, or a maximum heat state; and upon determining that the setpoint temperature is less than or equal to the sensed cabin temperature, transitioning from the HVAC electric heat state, the auxiliary heat state, or the maximum heat state to an off state.

Each of the embodiments disclosed herein may include one or more of the features described in connection with any of the other disclosed embodiments. To the accomplishment of the foregoing and related ends, certain illustrative aspects are described herein in connection with the following description and the appended drawings. These aspects are indicative, however, of but a few of the various ways in which the principles of the claimed subject matter can be employed and the claimed subject matter is intended to include all such aspects and their equivalents. Other advantages and novel features can become apparent from the following detailed description when considered in conjunction with the drawings.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for managing of multiple heat sources in an electric vehicle (e.g., an electric bus). While principles of the current disclosure are described with reference to an electric bus, it should be understood that the disclosure is not limited thereto. Rather, the systems of the present disclosure can be used to heat or cool any battery system, passenger cabin, or power electronic system (of any electric vehicle (car, train, etc.), machine, tool, appliance, etc.). Whereas the battery system charge is used to condition the cabin, the battery system can also be used to condition the batteries themselves or additional equipment (e.g., such as drivetrain components and power electronic components). Managing these systems and related components can be included in a hierarchy of control based on their criticality in operation of the vehicle.

In this disclosure, the terms "about," "substantially," or "approximate" are used to indicate a potential variation of 10% of a stated value.

Figure 1A:
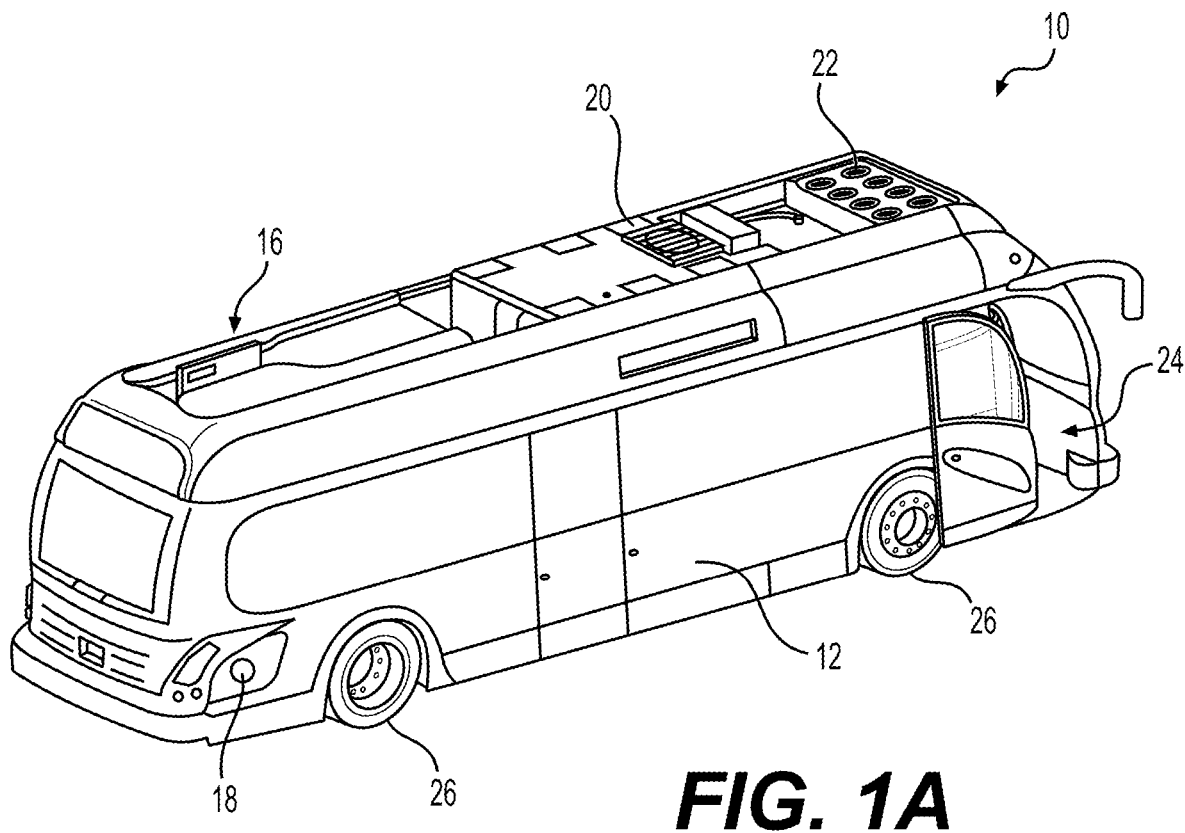
FIGS. 1A and 1B illustrate different views of an exemplary electric bus having a battery system.
Figure 1B:
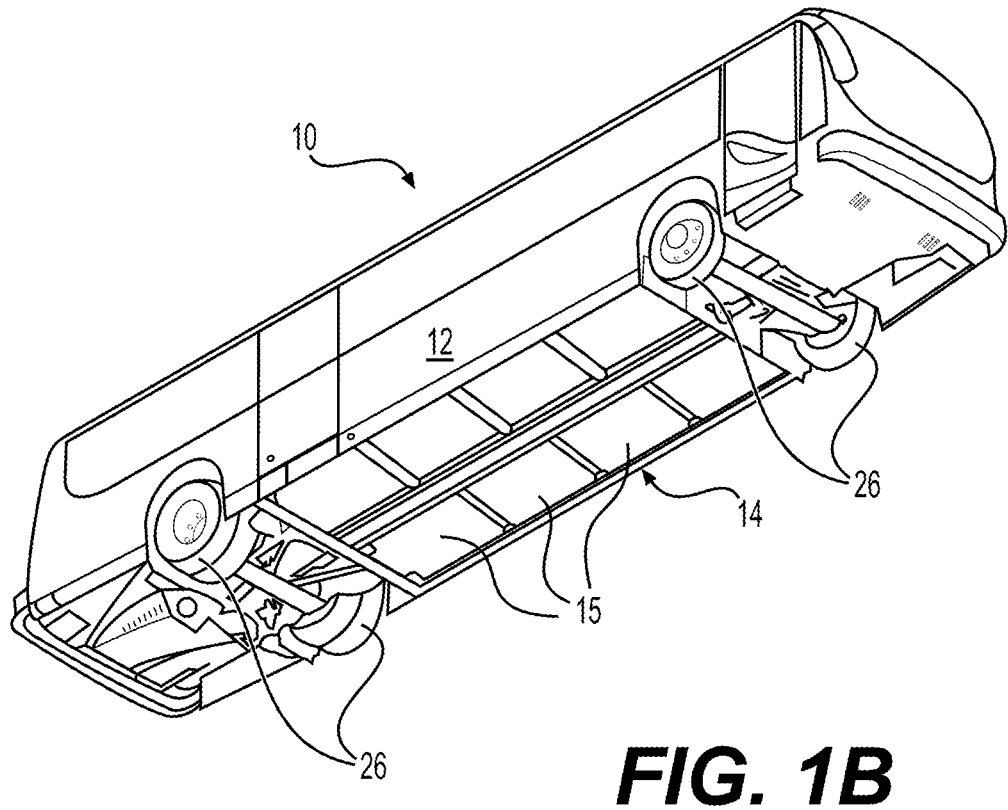

FIGS. 1A and 1B illustrate an electric vehicle (EV 10) in the form of an electric bus. As indicated above, although aspects of the current disclosure are described with reference to an electric bus, this is only exemplary. In general, EV 10 may include any type of electric vehicle. FIG. 1A shows an upper perspective view of EV 10, and FIG. 1B shows the undercarriage of EV 10. In the discussion that follows, reference will be made to both FIGS. 1A and 1B. EV 10 may include a body 12 enclosing a space for passengers, for example, a passenger compartment or cabin 24. In some embodiments, some (or all) parts of body 12 can be fabricated using one or more composite materials to reduce the weight of EV 10. In some embodiments, EV 10 can be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus can be about 12-16 inches (30-40 centimeters) from the road surface. Body 12 of EV 10 may have any size, shape, and configuration.

EV 10 may include an electric motor 18 that generates power for propulsion of EV 10, for example, via wheels 26. One or more battery packs 15 of a battery system 14 may store electrical energy to power the electric motor 18 and other accessories. In one aspect, EV 10 includes additional components, such as an HVAC system 20 to cool the cabin 24, a radiator 22 to assist in cooling the heat producing components of EV 10, and related power electronics (e.g., inverters, converters, internal and external lights, one or more controllers, one or more user interfaces, etc.). HVAC system 20 may include, among other components, an air circulation system (e.g., a blower, conduits, vents, etc.), an air conditioning (AC) unit having a compressor, condenser, evaporator and other conventional components, and an electric heater. Each of the components of HVAC system 20 may draw energy from battery system 14 of EV 10.

The blower of HVAC system 20 can include a blower configured to direct fresh and/or recirculated air through cabin 24. The AC unit of HVAC system 20 can be configured to absorb heat from air within the passenger cabin or from various electronics of EV 10 and expel that heat to ambient air outside of EV 10. The heater can be configured to convert electrical energy to heat energy by any suitable mechanism, such as, e.g., resistive heating elements. HVAC system 20 can be configured to utilize both fresh, ambient air, and recirculated cabin air when maintaining the temperature of cabin 24.

Although only one roof-mounted HVAC system 20 is shown in FIG. 1A, as discussed herein, EV 10 may include additional HVAC units, for example, coupled to a curb side and/or a street side of EV 10. A refrigerant and/or a coolant may circulate between one or more of HVAC 20, radiator 22, heat exchangers, the heat producing components (such as, for example, motors, batteries, etc.), and other components to either heat or cool these components. Although a charging interface 16, a charge port 19, HVAC system 20, and radiator 22 are illustrated as being positioned at specific locations (e.g., on the roof, rear, etc.) of the EV 10, in general, these components can be positioned anywhere on EV 10.

In some embodiments, as illustrated in FIG. 1B, battery system 14 can be positioned under the floor of the EV 10. Battery system 14 may have a modular structure and can be configured as a plurality of battery packs 15. In some embodiments, each battery pack 15 may include a housing enclosing, among others, a plurality of battery modules, each having multiple battery cells. In some embodiments, battery packs 15 can be positioned in cavities located under the floor of the EV 10. In some embodiments, as illustrated in FIG. 1B, battery packs 15 can be arranged in two parallel columns under the floor. An exemplary structure and configuration of battery system 14 is described in U.S. Pat. No. 10,998,587, which is incorporated herein by reference in its entirety.

Although battery system 14 is illustrated and described as being positioned under the floor of EV 10, this is only exemplary. In some embodiments, some or all of battery packs 15 of battery system 14 can be positioned elsewhere on the EV 10. For example, some of battery packs 15 can be positioned on the roof of EV 10. As battery system 14 may have considerable weight, placing battery system 14 under the floor of EV 10 may assist in keeping the center of gravity lower and balance weight distribution, thus increasing drivability and safety. Additionally, battery system 14 can be cooled or heated via liquid (e.g., a coolant) flowing through and/or around components of battery system 14.

The batteries of battery system 14 may have any chemistry and construction. In some embodiments, the batteries can be lithium titanate oxide (LTO) batteries. In some embodiments, the batteries can be nickel manganese cobalt (NMC) batteries. LTO batteries can be fast charge batteries that may allow EV 10 be recharged to substantially its full capacity in a small amount of time (e.g., about ten minutes or less). Due to its higher charge density, NMC batteries may take longer to charge to a comparable state of charge (SOC), but NMC batteries may retain a larger amount of charge and thus increase the range of EV 10. It is also contemplated that, in some embodiments, the batteries may include other or multiple different chemistries. For instance, some of the batteries can be LTO or NMC batteries, while other batteries may have another chemistry (for example, lead-acid, nickel cadmium, nickel metal hydride, lithium ion, zinc air, etc.). Some of the possible battery chemistries and arrangements in EV 10 are described in commonly assigned U.S. Pat. No. 8,453,773, which is incorporated herein by reference in its entirety.

In some embodiments, as illustrated in FIG. 1A, charging interface 16 can be provided on the roof of EV 10 to charge the batteries of battery system 14. Charging interface 16 may engage with a charging head of an external charging station (not shown) to charge the batteries of battery system 14. Details of the charging head and the interfacing of the charging head with charging interface 16 of EV 10 are described in commonly assigned U.S. Pat. Nos. 9,365,128 and 9,352,658, which are incorporated by reference in their entirety herein. Additionally or alternatively, in some embodiments, battery system 14 can be charged by connecting an external power supply to charge port 19 located, for example, on a side surface of EV 10. To charge battery system 14 through charge port 19, a connector carrying power from an external power supply can be plugged into charge port 19. In some embodiments, charge port 19 can be a standardized charge port (e.g., SAE J1772 charge port) that is configured to receive a corresponding standardized connector (e.g., SAE J1772 connector). Details of an exemplary charge port 19, and an exemplary method of using the charge port 19, are described in U.S. Pat. No. 9,669,719, which is incorporated by reference in its entirety herein.

Figure 1C:
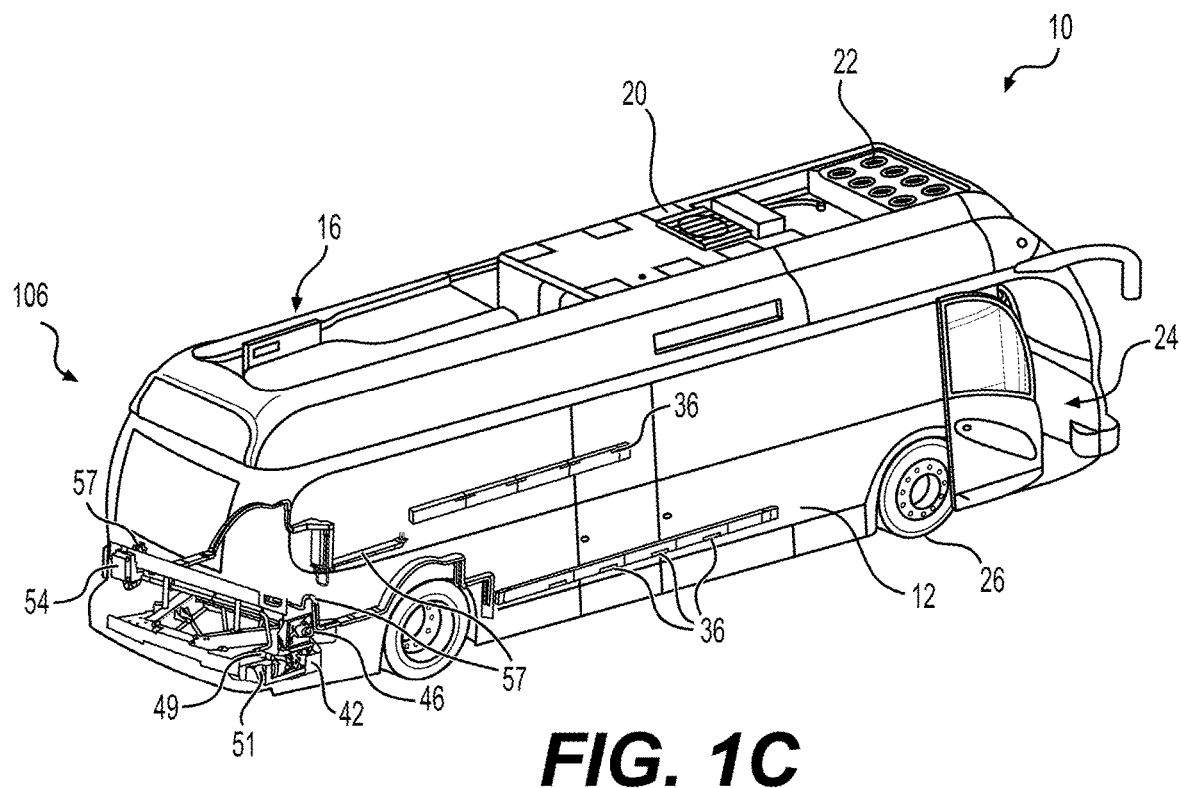
FIGS. 1C and 1D illustrate different views of the exemplary electric bus of FIGS. 1A and 1B having the battery system and components of its heat management system.

FIG. 1C shows an upper perspective view of EV 10 with exemplary auxiliary heating system components which can be part of a cabin temperature control system 106 of EV 10 used to manage, control, and/or regulate temperatures of (i.e., heat or cool) one or more compartments of cabin 24. For example, cabin temperature control system 106 may include a plurality of fluid conduits coupled to a plurality of heat exchangers, including HVAC system 20 as well as fuel-fired heat from an auxiliary power generation device (e.g., auxiliary power generation device 42 described more particularly below). In some aspects, fluid flow (e.g., of coolant and/or refrigerant and/or air) can be selectively controlled by a corresponding system controller (e.g., system controller 210 described below). In some aspects, managing the system controller (e.g., the communication between heat source controllers, such as controllers for the auxiliary heating system and HVAC system) can include an agreed upon framework of communication, control, permissives, and priorities. The framework of communication of the system controller can define which controllers control which heat sources, how each heat source operation is communicated through the network, which controllers have priority in determining the heat source(s) to be used and what, if any, augmentation to the control by system controller is allowed. In some aspects, a system controller can override the other heat system controllers in selecting and/or transitioning between heating modes. In some aspects, the system controller can include an algorithm, communication protocol and user selectable options to allow multiple variations of heat control to be used under the same, central system controller, thus allowing operation variation under the same algorithm(s).

In some embodiments, HVAC 20 can include an outside air heat exchanger and system 106 can include one or more interior or inside air heat exchangers. It is understood that outside air heat exchanger(s) and inside air heat exchanger(s) of system 106 may receive air, either ambient air from outside EV 10 or air from within cabin 24 of EV 10, such that the received air is either heated or cooled via thermal interaction with refrigerant and/or coolant. The heated or cooled air may then be output, either to outside EV 10 or to cabin 24 of EV 10. The flow of air can be controlled by one or more fluid conveying devices, such as one or more fans. Heat exchangers of system 106 can be any type of heat exchanger that is configured to transfer heat (e.g., plate, shell and tube heat exchangers, double pipe heat exchangers, condensers, evaporators, circuit heat exchangers, finned tube heat exchangers, rotary heat exchangers, etc.). Aspects of system 106 can be coupled (e.g., wired or wirelessly connected) to the system controller and/or to a user interface, for example, within cabin 24 of EV 10. The controller and/or user interface may control operations of system 106 based on information sensed from sensors of EV 10 (e.g., ambient temperature, cabin temperature, load on electric motor, etc.). In some aspects, an operator may control aspects of system 106 (e.g., via the user interface) based on determined operating conditions or performance characteristics.

EV 10 can include an auxiliary heating device 42 (e.g., auxiliary diesel heater) which can generate and supply heat to the cabin or batteries or cabin associated therewith. Device 42 can include fill port 46 for adding fuel to device 42. Auxiliary components used with device 42 can be for heating or cooling EV 10, including but not limited to auxiliary body radiators 36 to assist in cooling and/or heating components of EV 10. Radiators 36 can be positioned along sidewalls of body 12 between forward and rear wheels 26 of EV 10. A plurality of body pass-thrus 57 can be included in communication with device 42 and positioned in the rear portion of EV 10 (e.g., at or adjacent either or both rear wheel wells, at or adjacent either or both lower rear corners of EV 10). A heater 51 (e.g., a water heater), one or more expansion tanks 54 and coolant pumps 49 can also be included in the rear portion of EV 10 to manage thermal aspects of EV 10 by directing temperature regulation fluid (e.g., coolant, refrigerant, water, etc.).

Figure 1D:
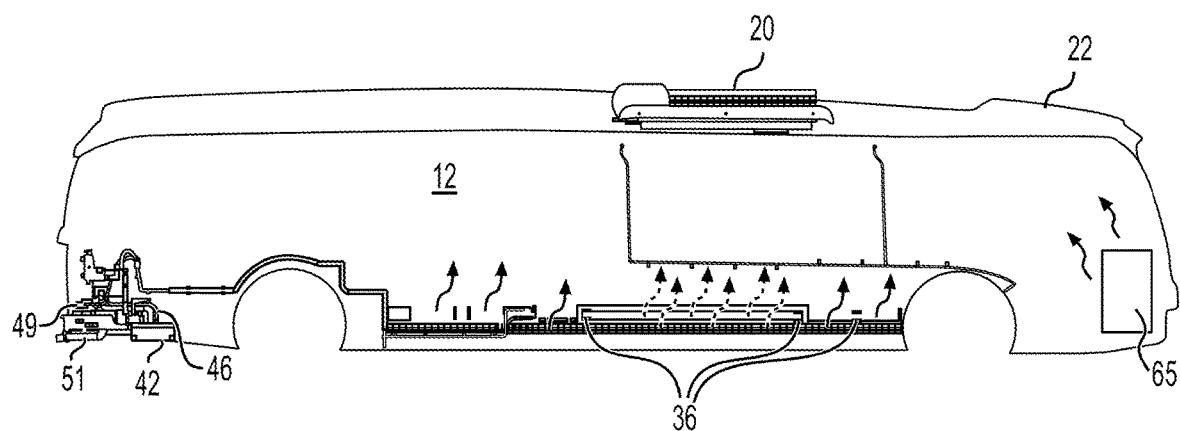

FIG. 1D shows a side plan view of EV 10 in an exemplary thermal schematic showing the auxiliary components and related management of cabin temperature. As shown, EV 10 can include a defroster 65 positioned in the forward portion thereof. During use, heat from defroster 65 can affect operations of HVAC system 20 and auxiliary heating system(s) (e.g., heat from device 42, radiators 36, pass-thrus 57, heater 51 (e.g., a water heater), one or more expansion tanks 54 and coolant pumps 49 by way of additional heat impacting cabin temperature measurement at HVAC system 20. In some aspects, as shown by arrows indicating direction of heat from respective components, use of defroster 65 heat can reduce the need for heat from other heat sources of EV 10, such as HVAC system 20 and device 42.

Figure 2:
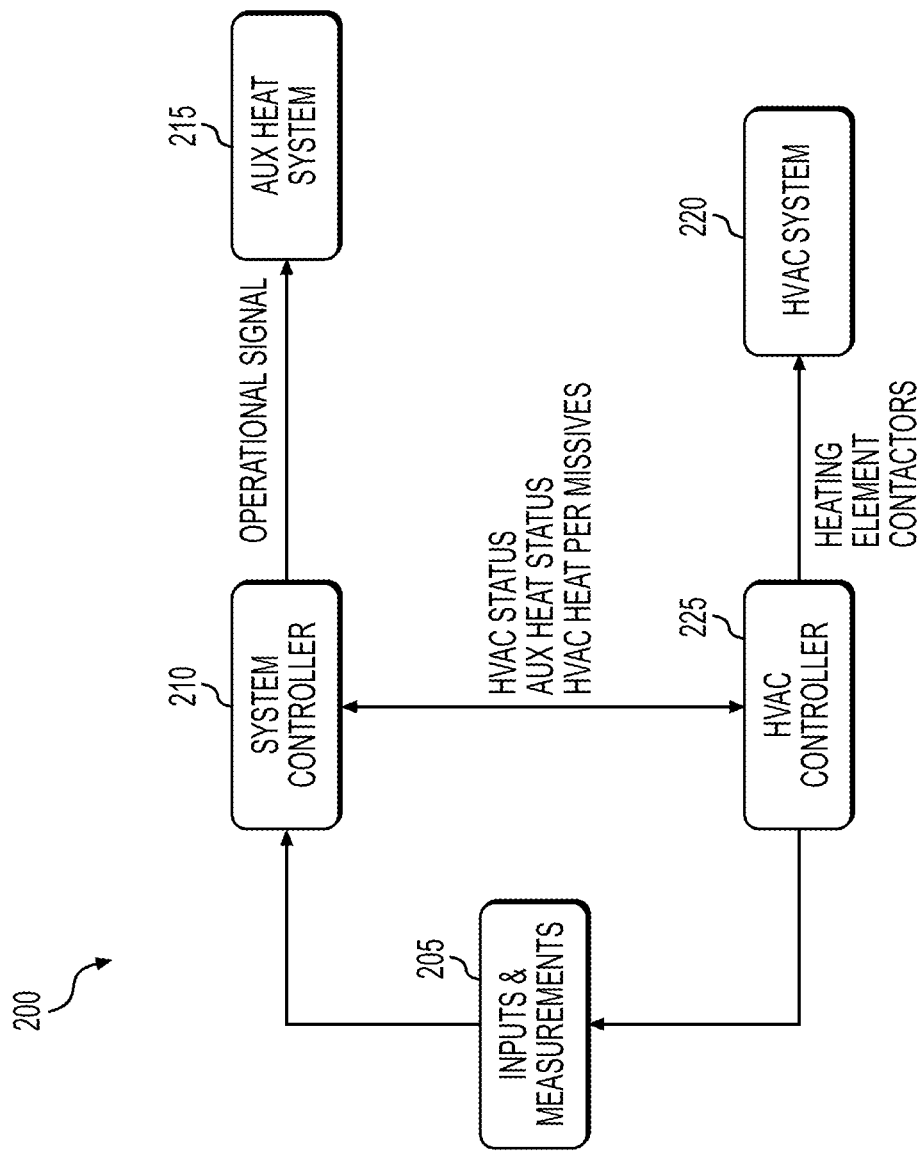
FIG. 2 illustrates an exemplary schematic of operations of a temperature management system of the vehicle of FIGS. 1A to 1D.

FIG. 2 illustrates an exemplary schematic of operations of a temperature management system 200 for cabin 24 of EV 10. System 200 includes a system controller 210 to manage aspects of system 200, including the auxiliary heat system 215 and HVAC system via HVAC system controller 225. System 215 can include one or more of the previously described auxiliary components such as device 42, radiators 36, pass-thrus 57, heater 51, one or more expansion tanks 54, coolant pumps 49, and defroster 65.

Data inputs (e.g., targets and limits) and measurements 205 can be received from system components, such as systems 220 and 215, including any sensors thereof (e.g., vehicle sensors such as one or more cabin temperature sensors) as well as controller 225. System controller 210 can monitor inputs and measurements 205, including available power and energy of EV 10, including of its battery system and energy of auxiliary heat system 215, and send operation commands or requests to regulate cabin temperature. Exemplary inputs and measurements 205 received by system controller 210 may include signals indicative of operational parameters of EV 10, including but not limited to one or whether doors or windows of EV 10 are open or closed, current sensed cabin temperature, ambient temperature outside of EV 10, a state of charge (SoC) of the battery system, auxiliary system operating conditions, a location of EV 10, a setpoint cabin temperature, and/or related trends determined by system controller 210. Various vehicle and cabin sensors may measure these parameters and direct them as inputs to system controller 210. In some aspects, the setpoint cabin temperature can be a user-selected temperature setpoint from an operator of EV 10 (e.g., via one or more buttons, touchscreens, or the like) that enables a driver or other person to indicate user-selected temperature setpoint for cabin 24. In some aspects, the setpoint cabin temperature can be remotely controlled or otherwise site, for example, from a third party (e.g., a command center or other entity that may set temperature setpoints for multiple vehicles in a fleet of vehicles).

Based on inputs and measurements 205, controller 210 can determine and transmit operational signals to heat sources of EV 10 to perform heat management operations. In some aspects, controller 210 can include a trend model for early detection of temperature anomalies (e.g., temperatures in one or more areas of cabin 24, temperatures in components of HVAC 20 and/or device 42, ambient temperature(s), battery system 14 temperatures, range or usage rate of battery system 14, etc.) before fault events occur thereby increasing vehicle efficiency. The trend model can be trained with a regression loss (e.g., mean squared error loss, Huber loss, etc.) and for binary index values it can be trained with a classification loss (e.g., hinge, log loss, etc.). Machine learning systems that can be trained include, but are not limited to convolutional neural network (CNN) trained directly with the appropriate loss function, CNN with layers with the appropriate loss function, capsule network with the appropriate loss function, Transformer network with the appropriate loss function, Multiple instance learning with a CNN (for a binary resistance index value), multiple instance regression with a CNN (for a continuous resistance index value), etc. In some aspects, the trend model can be been trained using a learned set of heating operation parameters of the temperature management system (e.g., historical data associated with systems 215 and 220) to predict one or more temperature parameters associated with the one more temperature anomalies, such as deviations or differentials from a setpoint, SoC of vehicle battery systems, fuel levels of device 42 (e.g., diesel fuel levels), usage rates of heating systems, location of the vehicle, operating schedule of the vehicle, etc.

Upon monitoring and determining that temperature anomalies are present or trending to be present, corrective actions can be recommended and/or taken by controller 210, including generating and transmitting an operational signal to system 215 so as to manage operations of corresponding components (e.g., device 42, radiators 36, pass-thrus 57, heater 51 (e.g., a water heater), one or more expansion tanks 54, coolant pumps 49, and defroster 65.

HVAC controller 225 can be configured to manage HVAC system 220 in tandem with controller 210. HVAC controller 225 can monitor and manage, based on measurements from cabin temperature sensors as well as information from controller 210, aspects of temperatures of the cabin of EV 10. Controller 210 can include logic to determine, based on inputs and measurements 205, system operational status such as HVAC status, AUX heat status, and HVAC heat per missives. Controller 210 can be in bidirectional communication with controller 225 to communicate the determined system operational status. In some aspects, based on system operational status, inputs and measurements 205, and a safety cabin temperature and a cabin setpoint temperature, HVAC controller 225 can activate corresponding heating element contactors of HVAC system 220 to selectively control the number of HVAC system 220 elements as well as monitor system safety.

Figure 3:
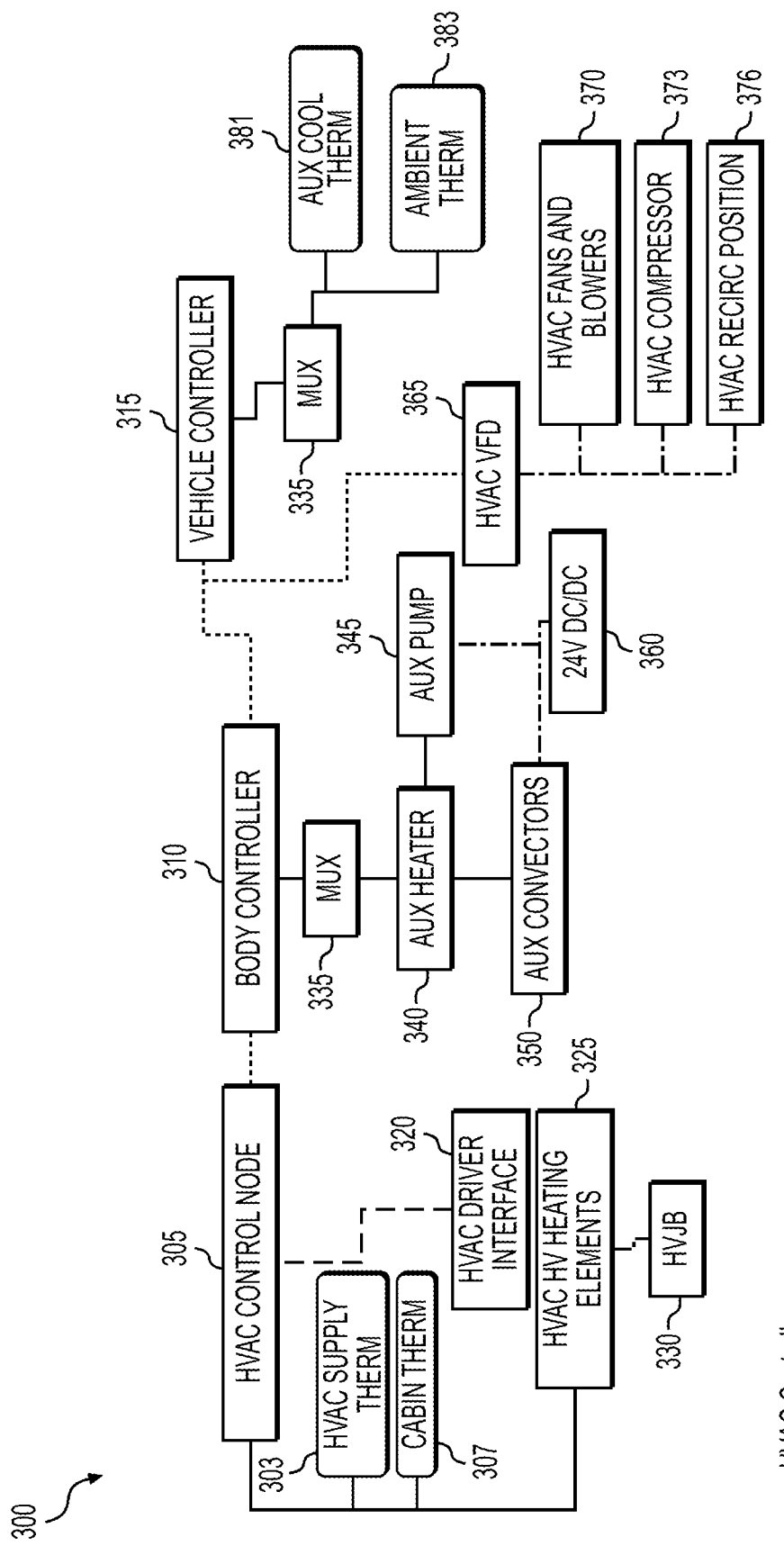
FIG. 3 illustrates a flow chart of an exemplary control method of the temperature management system of the vehicle of FIGS. 1A to 1D.

FIG. 3 illustrates an exemplary configuration of a temperature management system 300 of EV 10. In some aspects, body controller 310 and vehicle controller 315 can be included to manage temperature aspects (e.g., cabin temperature) of the body and vehicle, respectively. Controller 315 can be in direct communication with multiplexer (MUX) 335 to manage certain operations based on operational parameters such as sensed auxiliary coolant temperature 381 and ambient temperature 383. As used herein, the term "multiplexer" generally encompasses any electronic computational device such as, for example, a computer system. Moreover, while certain embodiments below may discuss a multiplexer as performing a particular act, it should be understood that such acts are not exclusively performed by such multiplexer, and that such multiplexer may perform other or additional acts.

Controller 315 can also be in communication with HVAC motor controller 365, which can be a variable frequency drive (VFD). Controller 365 can receive operation instructions from controller 315 based on information and data, such as temperatures 381, 383, to vary frequency and voltage of power supplied to HVAC fans and blowers 370, HVAC compressor 373, and HVAC recirculation position 376. Controller 315 can also be in communication with controller 310. In some aspects, controller 310 can be in direct communication with another MUX 335 to, in turn, manage certain operations of auxiliary heater 340, auxiliary pump 345, and auxiliary convectors 350. Heater 340, pump 345, and convectors 350 can be in electrical communication with DC/DC converter 360 (e.g., 24V DC/DC converter) for low voltage charging (e.g., charge 24V bus).

Controller 310 can also be in communication with HVAC control node 305, such as a wireless node, whereby controller 310 via node 305 can manage operations of HVAC driver interface 320. Node 305 can facilitate managing certain operations based on operational parameters such as sensed HVAC supply temperature 303 (e.g., the temperature coming out of the HVAC), cabin temperature 307, and operational parameters sensed from HVAC high-voltage (HV) heating elements 325 and/or High-Voltage Junction Box (HVJB) 330.

Figure 4:
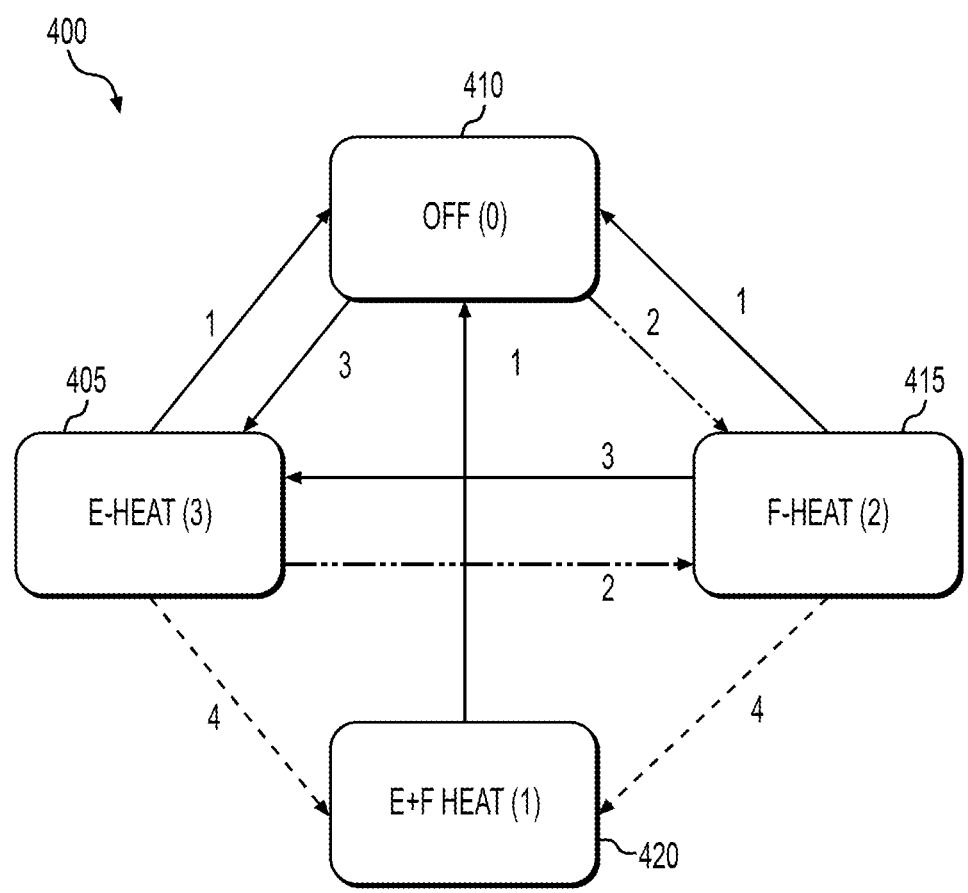
FIG. 4 illustrates a flow chart of an exemplary control method of the temperature management system of the vehicle of FIGS. 1A to 1D.

FIG. 4 illustrates an exemplary configuration and control method of an exemplary temperature management system 400 of EV 10. In system 400, the auxiliary heat source(s) can operate as a primary or supplemental heat source in combination with HVAC electric heat. System 400 is illustrated with a state diagram that defines which heat mode system operates and/or transitions between operational states according to one or more operating conditions. In some aspects, system 400 can include a plurality of system operational states, which can include an "off" state 410, an HVAC electric heat "on" state 405 (hereafter E-heat 405), a fuel fired heat "on" state 415 (hereafter F-heat 415), and a maximum heat state 420. E-heat 405 can be defined by delivering heat by the HVAC system to cabin 24 of EV 10. F-heat 410 can be defined by delivering heat by the auxiliary heating system to cabin 24 of EV 10. The "off" state 410 can be defined by deactivating E-heat 405 and F-heat 415 so that both are off and heat is not delivered to the cabin 24 of EV 10 from either system. Maximum heat state 420 can be defined in certain aspects by states 405 and 415 both being activated in an "on" state. Transitions between respective states of system 400 can be controlled to be limited to initial single source heat (e.g., E-heat 405 or F-heat 415) and to then transition to the "off" state 410 or the maximum heat state 420 (e.g., HVAC electric heat and fuel fire heat) and then the "off" state 410.

Transitioning between states 405, 410, 415, and 420 can be governed by certain transition setpoint conditions. For example, a first transition setpoint 1 can be defined by whether a setpoint temperature is less than or equal to a sensed cabin temperature. In FIG. 4, setpoint 1 is illustrated as an example setpoint condition denoted over the arrows between "off" state 410 and E-heat 405, F-heat 415, and maximum heat state 420. In some aspects, if according to setpoint 1 the setpoint temperature is less than or equal to a sensed cabin temperature while in E-heat 405, F-heat 415, or the maximum heat state 420, then system controller of system 400 will cause a transition from the respective E-heat 405, F-heat 415, and/or maximum heat states 420 to "off" state 410.

A second transition setpoint 2 can be defined by whether the difference between a setpoint temperature (e.g., between 60 and 80 degrees Fahrenheit) and the sensed cabin temperature is greater than an auxiliary heat temperature differential limit (e.g., within approximately 2 and 5 degrees Fahrenheit, greater than 5 degrees Fahrenheit, etc.). It is understood that these provided examples are not limiting that the described system utilizes one or more hysteresis controls. For example and without limitation, the actual temperature setpoint can be set by relative difference between the setpoint and the cabin temperature. In some aspects, the setpoint(s) (e.g., setpoint 2) of this example can be a function of any latent heat left in the system after a heat command is removed.

In some aspects, the auxiliary heat temperature differential limit can be the temperature away from the setpoint that will allow auxiliary heat to turn on. Setpoint 2 is illustrated as an example setpoint condition denoted over the arrows between "off" state 410 and F-heat 415 and between E-heat 405 and F-heat 415. In some aspects, if according to setpoint 2, the setpoint temperature and the sensed cabin temperature is greater than an auxiliary heat temperature differential limit while in the "off" state 410, then the system controller of system 400 will cause a transition from the "off" state 410 to F-heat 415. Similarly, if according to setpoint 2, the setpoint temperature and the sensed cabin temperature is greater than an auxiliary heat temperature differential limit while in E-heat 405, then system 400 will transition from E-heat 405 to F-heat 415.

A third transition setpoint 3 is defined by whether the difference between a setpoint temperature and the sensed cabin temperature is less than an auxiliary heat temperature differential limit. Setpoint 3 is illustrated as an example setpoint condition denoted over the arrows between "off" state 410 and E-heat 405 and between F-heat 415 and E-heat 405. In some aspects, if according to setpoint 3, the setpoint temperature and the sensed cabin temperature is less than an auxiliary heat temperature differential limit while in the "off" state 410, then system 400 will transition from the "off" state 410 to E-heat 405. Similarly, if according to setpoint 3, the setpoint temperature and the sensed cabin temperature is less than an auxiliary heat temperature differential limit while in F-heat 415, then the system controller of system 400 will cause a transition from F-heat 415 to E-heat 405.

A fourth transition setpoint 4 is defined by whether a single source heat timer has expired. Setpoint 4 is illustrated as an example setpoint condition denoted over the arrows between E-heat 405 and F-heat 415 and maximum heat 420. In some aspects, if according to setpoint 4, if a respective heat timer associated with E-heat 405 and F-heat 415 has expired, then system 400 will transition from E-heat 405 and/or F-heat 415 to maximum heat 420. The single source heat timer can be defined as the amount of time both heat sources can turn on if a setpoint temperature is not reached. In some aspects, the single source heat timer can be separately defined for different heat sources when different heat sources are time limited differently.

Figure 5:
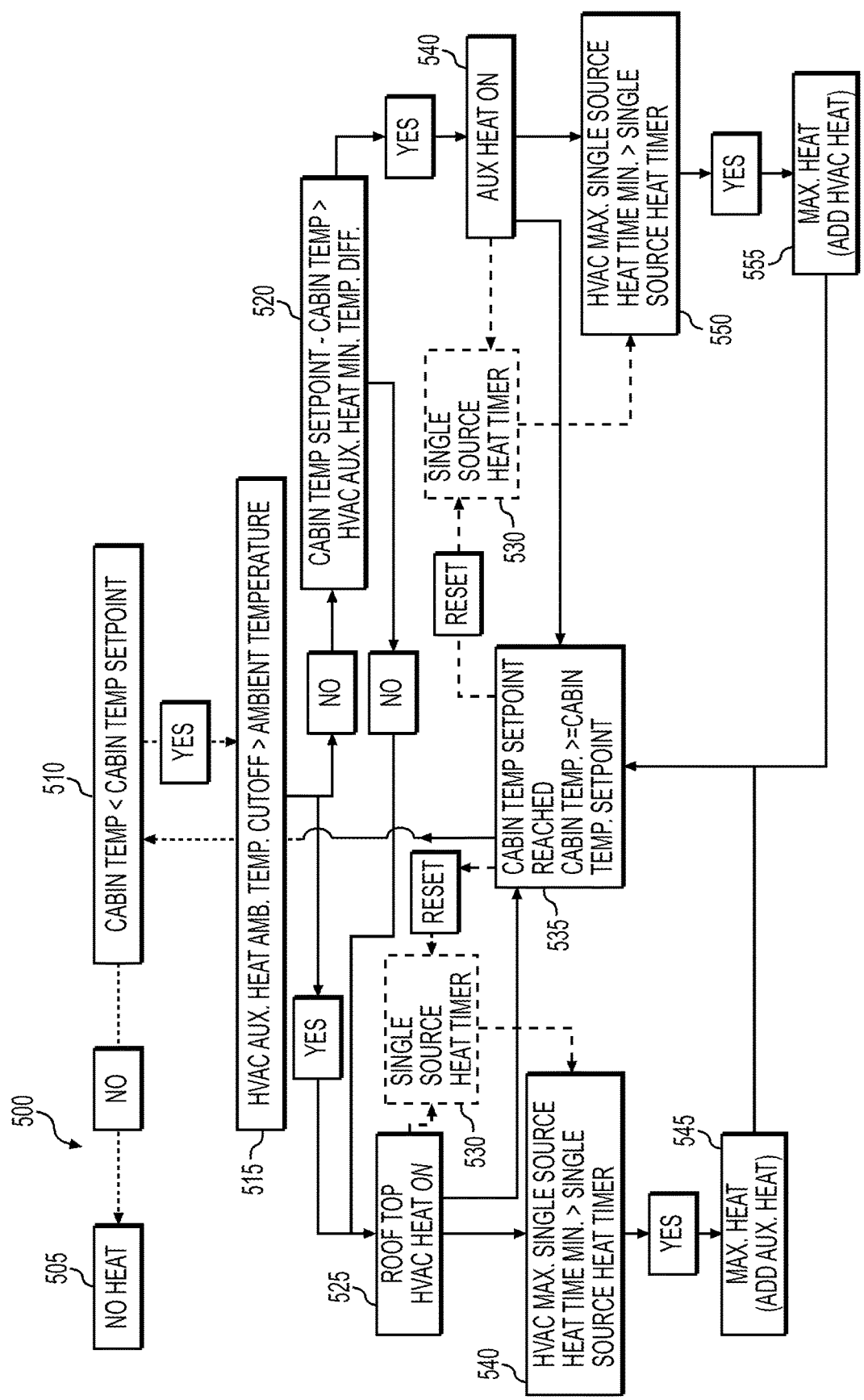
FIG. 5 illustrates a flow chart of another exemplary control method of the temperature management system of the vehicle of FIGS. 1A to 1D.

FIG. 5 illustrates an exemplary a flow chart illustrating an exemplary method 500 of using an exemplary temperature management system of EV 10. In method 500, the system controller can initially determine in step 510 whether a determined cabin temperature (e.g., determined based on feedback from one or more cabin temperature sensors) is less than a cabin temperature setpoint (e.g. if the setpoint is approximately 70° F. and the cabin temperature is approximately 60° F.). In some aspects, if the cabin temperature setpoint is 70° F. and the cabin temperature were 80° F., then no heat is initiated. Thus, if the determined cabin temperature is greater than the cabin temperature setpoint, then in step 505 the system controller causes no heat to be generated to adjust the cabin temperature. If the determined cabin temperature is less than the cabin temperature setpoint, then in step 515 the system controller further determines whether the HVAC and/or auxiliary heat ambient temperature cutoff is greater than the ambient temperature.

If in step 515 the HVAC and/or auxiliary heat ambient temperature cutoff is determined to be greater than the ambient temperature, then in step 525 the system controller activates the HVAC roof heat (see e.g., E-heat 405) for a duration of a single source heat timer of the HVAC roof system, as in step 530. An exemplary time of reference of the single source heat timer can be approximately 15 minutes. However, in general, the heat timer can be any time period (e.g., less than 1 min, 1 min, 5 min, 10 min, 30 min, 1 hour, etc.). In step 550, the system controller determines whether the HVAC maximum single source heat time minimum is greater than the single source heat timer of step 530. If the HVAC maximum single source heat time minimum is greater than the single source heat timer, then in step 555 auxiliary heat is activated in combination with the HVAC heat to achieve maximum system heating (see, e.g., previously described maximum heat state 420) until the system controller determines in step 535 that the cabin temperature is greater than or equal to the cabin temperature setpoint. The system controller can then return to step 510 to determine if the cabin temperature is less than the cabin temperature setpoint. If the cabin temperature is not less than the cabin temperature setpoint, the system controller causes no heat to be generated to adjust the cabin temperature.

If in step 515 the HVAC and/or auxiliary heat ambient temperature cutoff is determined to be less than the ambient temperature, then in step 520 the system controller determines whether the difference between a cabin temperature setpoint and the sensed cabin temperature is greater than a minimum auxiliary heat temperature differential limit. If in step 515 the difference between the cabin temperature setpoint and the sensed cabin temperature is determined to be less than the minimum auxiliary heat temperature differential limit, then previously discussed steps 525, 530, 550, 555, and/or 535 can be performed.

If in step 520 the difference between the cabin temperature setpoint and the sensed cabin temperature is determined to be greater than the minimum auxiliary heat temperature differential limit, then in step 540 the system controller activates the auxiliary heat (e.g., F-heat 415) for a duration of a single source heat timer, as in step 530. In step 550, the system controller determines whether the HVAC maximum single source heat time minimum is greater than the single source heat timer of step 530. If the HVAC maximum single source heat time minimum is greater than the single source heat timer, then in step 555 HVAC heat (e.g., E-heat 405) is activated in combination with the auxiliary heat (e.g., F-heat 415) to achieve maximum system heating (see, e.g., previously described maximum heat state 420) until the system controller determines in step 535 that the cabin temperature is greater than or equal to the cabin temperature setpoint. The system controller can then return to step 510 to determine if the cabin temperature is less than the cabin temperature setpoint. If the cabin temperature is not less than the cabin temperature setpoint, the system controller causes no heat to be generated to adjust the cabin temperature.

The disclosed examples allow for a temperature control system with a master system controller configured to manage all heat sources of EV 10, including respective heat source sub-controllers. The master system controller of temperature control system may increase or decrease the cooling or heating of cabin 24, as well as aspects of the battery system and power electronics of the vehicle. In some embodiments, the system controller may regulate aspects of EV 10 provide for a more efficient heating or cooling of the various components of EV 10. Reducing and/or optimizing energy consumption from the battery system 14 of EV 10 required for thermal management can advantageously extend its operating time or range.

While principles of the present disclosure are described herein with reference to a temperature control system for various components of an electric vehicle, it should be understood that the disclosure is not limited thereto. The temperature control system resolves long-felt issues of efficiency, performance and emissions in the managing of multiple heat sources under the control of multiple controllers. The temperature control system can define which controllers control which heat sources, how each heat source operation communicates, which controllers have priority in determining the heat sources to be used and what if any augmentation to the control is allowed. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein can be used with any other embodiment disclosed herein.

We claim:

1. An electric vehicle, comprising:
a body enclosing a cabin;
a temperature management system comprising an HVAC system powered by a battery system of the electric vehicle and an auxiliary heating system, wherein a temperature in the cabin is regulated by the temperature management system; and
a controller configured to:
determine if a setpoint temperature is less than or equal to a sensed cabin temperature while operating (i) the HVAC system in an HVAC electric heat state, (ii) the auxiliary heating system in an auxiliary heat state, or (iii) a maximum heat state;
if the setpoint temperature is less than or equal to the sensed cabin temperature, then automatically transitioning to an off state from the HVAC electric heat state, the auxiliary heat state, or the maximum heat state;
determine that one or more temperature anomalies are present or trending to be present in the cabin; and
based on the determined one or more temperature anomalies, recommend or perform one or more corrective actions, the one or more corrective actions comprising generating and transmitting an operational signal to the auxiliary heating system so as to manage operations of one or more radiators, pass-thrus, a water heater, one or more expansion tanks, one or more coolant pumps, and/or defroster,
wherein determining one or more temperature anomalies using a trend model for early detection of temperature anomalies before temperature conditions occur thereby increasing vehicle efficiency, the trend model having been trained using a learned set of heating operation parameters of the temperature management system to predict one or more temperature parameters associated with the one more temperature anomalies.

2. The electric vehicle of claim 1, wherein the system controller is configured to:
determine an ambient temperature; and
upon determining that the sensed cabin temperature is less than the setpoint temperature, determine whether an HVAC and/or auxiliary heat ambient temperature cutoff is greater than the ambient temperature.

3. The electric vehicle of claim 2, wherein the system controller is configured to:
upon determining that the HVAC and/or auxiliary heat ambient temperature cutoff is greater than the ambient temperature, transition to the HVAC electric state for a duration of a heat timer.

4. The electric vehicle of claim 3, wherein the system controller is configured to:
upon determining that a heat time minimum of the HVAC electric state is greater than the duration of the heat timer, transition to the auxiliary heat state to achieve the maximum heat state until the sensed cabin temperature is greater than or equal to the setpoint temperature.

5. The electric vehicle of claim 4, wherein the system controller is configured to:
upon determining that the setpoint temperature is less than or equal to the sensed cabin temperature while operating in the maximum heat state, automatically transitioning from the maximum heat state to the off state.

6. The electric vehicle of claim 2, wherein the system controller is configured to:
upon determining that the HVAC and/or auxiliary heat ambient temperature cutoff is less than the ambient temperature, determine whether a difference between the setpoint temperature and the sensed cabin temperature is greater than a minimum auxiliary heat temperature differential limit.

7. The electric vehicle of claim 6, wherein the system controller is configured to:
upon determining that the difference between the setpoint temperature and the sensed cabin temperature is greater than a minimum auxiliary heat temperature differential limit, transition to the HVAC electric state for a duration of a heat timer.

8. A method of controlling temperature in a cabin of an electric vehicle with a temperature management system, the electric vehicle comprising an HVAC system powered by a battery system of the electric vehicle and an auxiliary heater, the method comprising:
upon determining, by a system controller of the temperature management system, that a setpoint temperature is less than or equal to a sensed cabin temperature while operating in (i) an HVAC electric heat state, (ii) an auxiliary heat state, or (iii) a maximum heat state, automatically transitioning to an off state from the (i) HVAC electric heat state, (ii) the auxiliary heat state, or (iii) the maximum heat state;
determine an ambient temperature;
upon determining that the sensed cabin temperature is less than the setpoint temperature, determine whether an HVAC and/or auxiliary heat ambient temperature cutoff is greater than the ambient temperature; and
upon determining that the HVAC and/or auxiliary heat ambient temperature cutoff is greater than the ambient temperature, transition to the HVAC electric state for a duration of a heat timer.

9. The method of claim 8, further comprising:
controlling, by the system controller, subcontrollers of the HVAC system and the auxiliary heater.

10. The method of claim 8, further comprising:
delivering heat, by the HVAC system in the HVAC electric heat state, to the cabin of the electric vehicle;
delivering heat, by the auxiliary heater in the auxiliary heat state, to the cabin of the electric vehicle;
delivering heat, by both the auxiliary heater and the HVAC system in the maximum heat state, to the cabin of the electric vehicle; and/or
deactivating the auxiliary heater and the HVAC system in the off state.

11. The method of claim 8, further comprising:
upon determining, by the system controller, that a difference between the setpoint temperature and the sensed cabin temperature is greater than an auxiliary heat temperature differential limit, automatically transitioning from the off state to the auxiliary heat state.

12. The method of claim 11, wherein the auxiliary heat temperature differential limit is a temperature away from the setpoint temperature to transition to the auxiliary heat state.

13. The method of claim 8, further comprising:
upon determining, by the system controller, that a difference between the setpoint temperature and the sensed cabin temperature is greater than an auxiliary heat temperature differential limit, automatically transitioning from the HVAC heat state to the auxiliary heat state.

14. The method of claim 8, further comprising:
upon determining, by the system controller, that a difference between the setpoint temperature and the sensed cabin temperature is less than an auxiliary heat temperature differential limit, automatically transitioning from the off state to the HVAC heat state.

15. The method of claim 8, further comprising:
upon determining, by the system controller, that a difference between the setpoint temperature and the sensed cabin temperature is less than an auxiliary heat temperature differential limit, automatically transitioning from the auxiliary heat state to the HVAC heat state.

16. The method of claim 8, further comprising:
upon determining, by the system controller, that a heat timer of the HVAC heat state and/or the auxiliary heat state has expired, automatically transitioning from the HVAC heat state and/or the auxiliary heat state to the maximum heat state.

17. The method of claim 16, wherein the heat timer is defined as an amount of time both heat sources can turn on if the setpoint temperature is not reached.

18. A temperature management system for an electric vehicle, comprising:
an HVAC system powered by a battery system of the electric vehicle;
an auxiliary heating system;
wherein the HVAC system and the auxiliary heating system are configured to condition air within a cabin of the electric vehicle; and
a control unit configured to:
determine if a setpoint temperature is less than or equal to a sensed cabin temperature while operating (i) the HVAC system in an HVAC electric heat state, (ii) the auxiliary heating system in an auxiliary heat state, or (iii) a maximum heat state; upon determining that the setpoint temperature is less than or equal to the sensed cabin temperature, transitioning to an off state from the HVAC electric heat state, the auxiliary heat state, or the maximum heat state;
determine an ambient temperature;
upon determining that the sensed cabin temperature is less than the setpoint temperature, determine whether an HVAC and/or auxiliary heat ambient temperature cutoff is greater than the ambient temperature; and
upon determining that the HVAC and/or auxiliary heat ambient temperature cutoff is greater than the ambient temperature, transition to the HVAC electric state for a duration of a heat timer.

* * * * *